(12) United States Patent
Araki et al.

(10) Patent No.: US 12,420,808 B2
(45) Date of Patent: Sep. 23, 2025

(54) ADAPTIVE DYNAMIC DRIVER TRAINING SYSTEMS AND METHODS

(71) Applicant: TOYOTA RESEARCH INSTITUTE, INC., Los Altos, CA (US)

(72) Inventors: Minoru Brandon Araki, Saratoga, CA (US); Michael Thompson, San Juan Capistrano, CA (US); James Dallas, Mountain View, CA (US); Yan Ming Jonathan Goh, Palo Alto, CA (US); Avinash Balachandran, Sunnyvale, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 212 days.

(21) Appl. No.: 17/874,025

(22) Filed: Jul. 26, 2022

(65) Prior Publication Data

US 2024/0034335 A1 Feb. 1, 2024

(51) Int. Cl.
*B60W 40/09* (2012.01)
*B60W 40/08* (2012.01)
*B60W 50/10* (2012.01)
*B60W 50/16* (2020.01)

(52) U.S. Cl.
CPC ............ *B60W 40/09* (2013.01); *B60W 50/10* (2013.01); *B60W 50/16* (2013.01); *B60W 2040/0809* (2013.01); *B60W 2540/30* (2013.01)

(58) Field of Classification Search
CPC ..... B60W 2040/0809; B60W 2540/22; B60W 2540/30; B60W 40/09; B60W 50/10; B60W 50/14; B60W 50/16
See application file for complete search history.

(56) References Cited

U.S. PATENT DOCUMENTS

| 5,921,780 | A | 7/1999 | Myers |
| 8,894,415 | B2 | 11/2014 | Best |
| 8,915,738 | B2 * | 12/2014 | Mannino ............... G09B 9/052 |
| | | | 434/236 |
| 9,424,696 | B2 | 8/2016 | McQuade |

(Continued)

FOREIGN PATENT DOCUMENTS

CN 113859246 A * 12/2021

OTHER PUBLICATIONS

Waldmann et al., "Der BMW TrackTrainer—automatisiertes Fahren im Grenzbereich auf der Nürburgring Nordschleife," 11 pages (https://mediatum.ub.tum.de/doc/1142262/1142262.pdf).

(Continued)

*Primary Examiner* — Babar Sarwar
(74) *Attorney, Agent, or Firm* — SHEPPARD, MULLIN, RICHTER & HAMPTON LLP; Daniel N. Yannuzzi

(57) ABSTRACT

Systems and methods are provided for dynamic driver training, and may include: a communication interface to receive sensor data, the sensor data comprising driver biometric data and driver performance data for a driver operating a vehicle; a driver inference circuit to infer a skill level and emotional state of the driver operating the vehicle; and a driver training circuit to, based on the inferred skill level and emotional state of the driver operating the vehicle, dynamically adjust a driver training level for the driver while the driver is operating the vehicle.

20 Claims, 5 Drawing Sheets

(56) References Cited

U.S. PATENT DOCUMENTS

| | | | |
|---|---|---|---|
| 9,653,001 B2* | 5/2017 | Mughal | G09B 19/167 |
| 9,805,601 B1* | 10/2017 | Fields | G06F 18/214 |
| 9,847,043 B1 | 12/2017 | Fields | |
| 10,082,791 B2* | 9/2018 | Bertollini | G05D 1/0276 |
| 10,228,256 B2 | 3/2019 | Singh | |
| 10,556,600 B2 | 2/2020 | James | |
| 10,614,726 B2 | 4/2020 | Harkness | |
| 11,104,349 B1* | 8/2021 | Leung | B60W 40/09 |
| 11,279,279 B2* | 3/2022 | Tamrakar | G06F 3/167 |
| 11,404,075 B1* | 8/2022 | Lakhani | G10L 25/51 |
| 12,056,722 B1* | 8/2024 | Sanchez | G06Q 30/0204 |
| 2012/0135382 A1 | 5/2012 | Winston | |
| 2012/0215375 A1* | 8/2012 | Chang | B60W 50/14 |
| | | | 701/1 |
| 2013/0189649 A1* | 7/2013 | Mannino | G09B 9/052 |
| | | | 434/65 |
| 2014/0210625 A1* | 7/2014 | Nemat-Nasser | G08B 21/06 |
| | | | 340/575 |
| 2015/0186817 A1* | 7/2015 | Kim | G06Q 10/0635 |
| | | | 705/7.28 |
| 2015/0258996 A1 | 9/2015 | Trent | |
| 2015/0262484 A1 | 9/2015 | Trent | |
| 2016/0163217 A1* | 6/2016 | Harkness | G09B 7/00 |
| | | | 434/65 |
| 2016/0167674 A1 | 6/2016 | Zeiger | |
| 2017/0212515 A1* | 7/2017 | Bertollini | B60W 50/14 |
| 2017/0355377 A1* | 12/2017 | Vijaya Kumar | B60W 50/0098 |
| 2018/0075309 A1* | 3/2018 | Sathyanarayana | G05D 1/0088 |
| 2018/0174457 A1* | 6/2018 | Taylor | G06N 3/045 |
| 2018/0237027 A1* | 8/2018 | Lundsgaard | G01M 17/007 |
| 2019/0265712 A1* | 8/2019 | Satzoda | B60W 40/09 |
| 2019/0337532 A1 | 11/2019 | Myers | |
| 2019/0370722 A1* | 12/2019 | Serita | H04W 4/38 |
| 2020/0035124 A1 | 1/2020 | Li | |
| 2020/0062275 A1* | 2/2020 | Higgins | G05D 1/0088 |
| 2020/0255026 A1 | 8/2020 | Katardjiev | |
| 2020/0300655 A1* | 9/2020 | Masuo | G06Q 20/123 |
| 2020/0406903 A1* | 12/2020 | Zweig | B60Q 1/535 |
| 2022/0051589 A1* | 2/2022 | Madison | G09B 9/048 |
| 2022/0126837 A1* | 4/2022 | Croxford | B60W 50/16 |
| 2022/0377286 A1* | 11/2022 | Washio | H04N 7/188 |
| 2023/0114577 A1* | 4/2023 | Sameer | G06N 20/00 |
| | | | 340/436 |
| 2023/0234593 A1* | 7/2023 | Gupta | G06N 3/006 |
| 2023/0356728 A1* | 11/2023 | Jain | G06F 3/013 |

OTHER PUBLICATIONS

Schacher et al., "Driver Assistance Systems Teaching Humans How to Drive—The Mentoring Concept of the Race Trainer," ATZ Worldwide, 121(11):60-63, Oct. 25, 2019 (https://doi.org/10.1007/s38311-019-0130-3).

Garmin, "Garmin Catalyst Driving Performance Optimizer," Garmin.com (https://www.garmin.com/en-US/p/690726).

* cited by examiner

ADAPTIVE DYNAMIC DRIVER TRAINING SYSTEMS AND METHODS

The present disclosure relates generally driver training, and in particular, some implementations may relate to an adaptive dynamic driver trainer.

DESCRIPTION OF RELATED ART

Automated race training is a racecar driver training modality in which data gathering and processing technologies are used to either augment or replace a human racing instructor. Some goals of automated race training may include 1) to ensure the safety of the student, especially as the car is operated closer and closer to its performance limits, and 2) to teach the student racing principles as effectively and efficiently as possible. A secondary but still extremely important goal of training is to deliver a seamless user experience to the student in order to minimize their frustration and improve their learning experience. Delivering a seamless user experience on a real car is very challenging to do. Existing automated training relies on selecting training options and starting the car at a pre-defined lap "start" location while the car is stationary; training sessions typically last one lap. In order to change options or examine their data, the driver must come to a complete stop and exit autonomous training. The necessity of exiting training in order to change settings disrupts the flow of the student and slows down the pace of training.

BRIEF SUMMARY OF THE DISCLOSURE

According to various embodiments of the disclosed technology a driver training system may include: a communication interface to receive sensor data, the sensor data comprising driver biometric data and driver performance data for a driver operating a vehicle; a driver inference circuit to infer a skill level and to infer an emotional state of the driver operating the vehicle; and a driver training circuit to, based on the inferred skill level and emotional state of the driver operating the vehicle, dynamically adjust a driver training level for the driver while the driver is operating the vehicle during training.

The system may further include a driver feedback circuit to provide real-time driver-training feedback to the driver while the driver is operating the vehicle on a training track. The driver-training feedback may include at least one of audio, visual and haptic feedback.

The system may further include a driver feedback circuit to provide timed feedback to the driver, wherein the timed feedback is timed to be delivered to the driver to provide feedback relevant to a particular segment of a training track when the driver is operating the vehicle at that particular segment of the training track.

A method for driver training in various embodiments may include receiving sensor data, the sensor data comprising driver biometric data and driver performance data for a driver operating a vehicle;
based on the sensor data, inferring a skill level and emotional state of the driver operating the vehicle; and
based on the inferred skill level and emotional state of the driver operating the vehicle, dynamically adjusting a driver training level for the driver while the driver is operating the vehicle during training.

In various embodiments, dynamically adjusting a driver training level for the driver may include selecting a curriculum level for the driver that is commensurate with the inferred skill level of the driver, and implementing the selected curriculum level while the driver is operating the vehicle during training on a training track.

In various embodiments, dynamically adjusting a driver training level for the driver may include selecting a difficulty level driver that is commensurate with the inferred skill level of the driver, and implementing the selected difficulty level within the selected curriculum level while the driver is operating the vehicle during training on the track.

In various embodiments, the inferred emotional state of the driver may include an inferred level of confidence of the driver, and further wherein dynamically adjusting a driver training level for the driver may include selecting a curriculum level for the driver that is commensurate with the inferred level of confidence of the driver, and implementing the selected curriculum level while the driver is operating the vehicle during training on a training track.

In various embodiments, inferring a skill level and emotional state of the driver may include using a racing controller model that includes driver attributes as inferable parameters or using a model learned from labeled data.

In various embodiments, inferring a skill level and emotional state of the driver may be performed throughout a lap to adjust feedback dynamically during a lap.

In various embodiments, inferring an emotional state of the driver may include inferring a confidence level and caution level of the driver.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
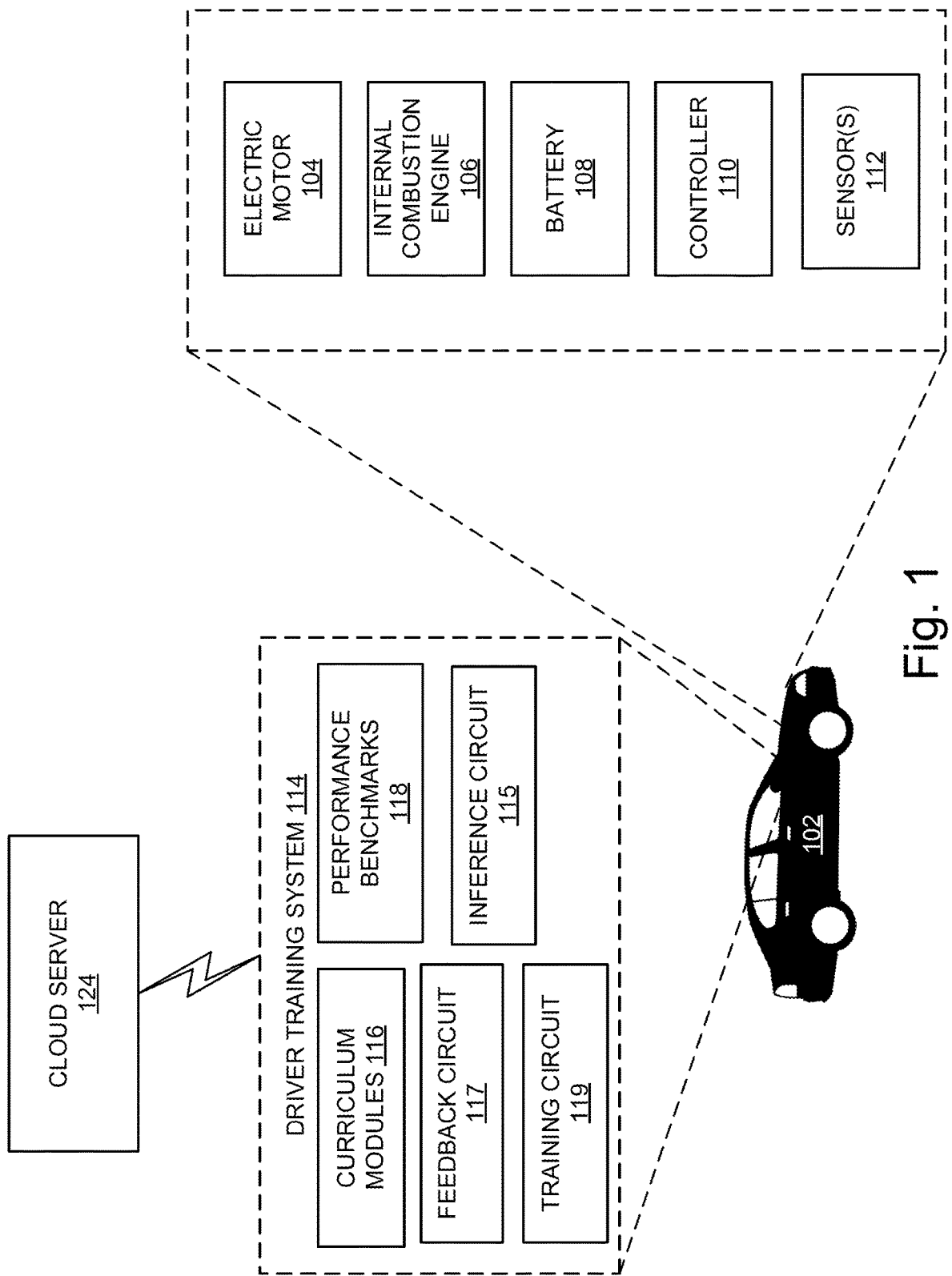
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

Systems and methods of the technology disclosed herein may include implementations of an automated driver training system, and particularly a racecar driver training system, that can adapt either or both car and training parameters on the fly, based, for example on a driver's command or the output of an algorithm. Implementations may be configured to evaluate the student as they drive and to adjust the difficulty level of training on the fly to match the student's ability. In various implementations, training may consist of a curriculum with multiple stages. In such a configuration, the automated trainer may have the capability to evaluate the student to determine both what stage of the curriculum is best for the student at the moment and also to detect when the student is ready to move on to the next stage of the curriculum. This automatic adjustment of difficulty level and transitioning through stages of the curriculum may be implemented to make the user experience more seamless for the student, allowing the student to focus on training rather than fiddling with the controls or stopping the car to switch modes.

The vehicles used for training may also be configured to provide sophisticated real-time audio or other feedback to the student, so that it will be less necessary for the student to stop the car to examine their data. For example, the automated trainer in some applications may be configured to deliver audio suggestions to the student such as "brake later the next time you approach the apex", or "you turned into the corner 10 feet too soon," and so on. As the student repeats a lap, the automated trainer may be configured to remind the student of suggestions it made in the previous lap; for example, "Remember to wait 10 feet before turning into this corner", or "remember to brake a little later going into the corner this time". These types of in-depth automated suggestions may allow the student to receive detailed feedback from the automated training system without needing to stop their training.

Systems and methods of the disclosed technology may be provided such that as a student performs some training task, the system can monitor the student and infer some characteristics (e.g., skill level, confidence level) about the student. The systems and methods may further be configured to use those characteristics to adjust the training for the particular student. For example, the system may be configured to change a level of difficulty, provide a message of reassurance or to be more careful, provide instructions/suggestions for improvement, and so on.

Example systems may use sensors of a vehicle, sensors monitoring a student (e.g., a camera, a heart rate monitor) and a mathematical model of how someone is expected to drive based on their confidence level or skill level that can be inferred from the sensed data. The mathematical model may operate on the vehicle or in a cloud environment, or a combination of the foregoing. The mathematical model can be determined from analyses of trajectories (e.g., the first lap can produce the trajectory that is analyzed and additional analyses can be performed on trajectories of subsequent laps even as the invention is used for these subsequent laps (e.g., continuously)) of the vehicle, particularly for trajectories produced in response to a reward function determined by an MPC controller.

In various applications, information from the sensors monitoring a student (e.g., eye gaze tracking, heart rate monitor) and sensors of a vehicle may be used to correlate an environment of the vehicle with a physiological response of the student to infer personal characteristics about the student.

As a student drives on a course, an inference engine will infer attributes about a student such as skill level, anxiety level, and confidence level, and a suggestion engine will offer them feedback tailored to their specific attributes. The inference engine will infer student attributes using sensors such as a heart rate monitor and a gaze tracker in addition to car-specific sensors.

Some implementations may use at least one of two ways to infer driver attributes: 1) a racing controller model that includes driver attributes as inferable parameters or 2) a model learned from labeled data. The goal of the suggestion engine is to give the driver confidence while also encouraging them to drive in a sweet spot of being not too cautious or reckless.

If a driver is not confident and not cautious, the suggestion engine will warn them to be more careful in order to increase their caution. If a driver is cautious and not confident, the suggestion engine may be configured to encourage them in order to increase their confidence and slightly lower their caution. If a driver is confident and cautious, the suggestion engine may be configured to encourage them to drive with slightly less caution. If a driver is confident and not cautious, the suggestion engine may be configured to warn them to drive with more caution.

Furthermore, the suggestion engine can infer the skill of the driver based off of how closely they follow the optimal racing trajectory and increase/decrease the level of feedback based on the driver's skill level.

The systems and methods disclosed herein may be implemented with any of a number of different vehicles and vehicle types for a number of different applications. While the technology disclosed herein may be particularly well suited to racing training for motor vehicle racing, it is not limited to such applications. The systems and methods disclosed herein may be used with automobiles, trucks, motorcycles, recreational vehicles and other like on-or off-road vehicles. In addition, the principals disclosed herein may also extend to other vehicle types as well. An example vehicle (HEV) in which disclosed technology may be implemented is illustrated in FIG. 1.

FIG. 1 illustrates a drive system of a vehicle 102 that may include an internal combustion engine 106 one or more electric motors 104 (which may also serve as generators) or a combination thereof as sources of motive power. Driving force generated by the internal combustion engine 106 and electric motors 104 can be transmitted to one or more wheels of the vehicle to move the vehicle.

Internal combustion engine 106 may include, for example, a gasoline, diesel or similarly powered engine in which fuel is injected into and combusted in a combustion chamber. Electric motor 104 can also be used to provide motive power in vehicle 102 and is powered electrically via a battery 108. Battery 108 may be implemented as one or more batteries or other power storage devices including, for example, lead-acid batteries, lithium ion batteries, capacitive storage devices, and so on. Battery 108 may be charged by connection to an AC mains supply or by a battery charger that receives energy from internal combustion engine 106. For example, an alternator or generator may be coupled directly or indirectly to a drive shaft of internal combustion engine 106 to generate an electrical current as a result of the operation of internal combustion engine 106. A clutch can be included to engage/disengage the battery charger. Battery 108 may also be charged by electric motor 104 such as, for example, by regenerative braking or by coasting during which time electric motor 104 operate as generator.

Electric motor 104 can be powered by battery 108 to generate a motive force to move the vehicle and adjust vehicle speed. Electric motor 104 can also function as a generator to generate electrical power such as, for example, when coasting or braking. Battery 108 may also be used to power other electrical or electronic systems in the vehicle. Electric motor 104 may be connected to battery 108 via an inverter 42. Battery 108 can include, for example, one or more batteries, capacitive storage units, or other storage reservoirs suitable for storing electrical energy that can be used to power electric motor 104. When battery 108 is implemented using one or more batteries, the batteries can include, for example, nickel metal hydride batteries, lithium ion batteries, lead acid batteries, nickel cadmium batteries, lithium ion polymer batteries, and other types of batteries.

A controller 110 (e.g., an electronic control unit (ECU)) may be included and may control the electric drive components of the vehicle as well as other vehicle components. For example, controller 110 may adjust driving current supplied to electric motor 104, and adjust the current received from electric motor 104 during regenerative coasting and braking. As a more particular example, output torque of the electric motor 104 can be increased or decreased by controller 110 through an inverter.

Controller 110 may include, for example, a microcomputer that includes a one or more processing units (e.g., microprocessors), memory storage (e.g., RAM, ROM, etc.), and I/O devices. The processing units of controller 110, execute instructions stored in memory to control one or more electrical systems or subsystems in the vehicle. Controller 110 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, controller 110 receives information from a plurality of sensors 112 included in vehicle 102. For example, controller 110 may receive signals that indicate vehicle operating conditions or characteristics, or signals that can be used to derive vehicle operating conditions or characteristics. These may include, but are not limited to accelerator operation amount, a revolution speed of internal combustion engine 106 (engine RPM), a rotational speed of the electric motor 104 (motor rotational speed), vehicle speed, roll, pitch and yaw of the vehicle, lateral acceleration, wheel spin, torque converter output (e.g., output amps indicative of motor output), brake operation amount/pressure, battery SOC (i.e., the charged amount for battery 108 detected by an SOC sensor), and other sensors. Sensors may also be included to detect driver state such as, for example, heart rate sensors, eye gaze sensors, perspiration sensors, movement sensors, and so on. These sensors can provide data that can be used to infer a driver's emotional condition. Accordingly, vehicle 102 can include a plurality of sensors 112 that can be used to detect various conditions internal or external to the vehicle and provide sensed conditions to other systems including driver training system 114.

In some embodiments, one or more of the sensors 112 may include their own processing capability to compute the results for additional information that can be provided to controller 110. In other embodiments, one or more sensors may be data-gathering-only sensors that provide only raw data to controller 110. In further embodiments, hybrid sensors may be included that provide a combination of raw data and processed data to controller 110. Sensors 112 may provide an analog output or a digital output.

Sensors 112 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

As noted above, the technology disclosed herein can be configured to provide dynamic, adaptable driver training. Accordingly, vehicle 102 may also include a driver training system 114 to provide customized driver feedback and training for drivers based on a driver's skill or comfort level. In the example of FIG. 1, training system 114 includes curriculum modules 116, performance benchmarks 118, driver training circuit 119 and inference circuit 115.

Curriculum modules 116 may include one or more driver training modules, and the different modules may be characterized as training modules for different skill levels. For example, there may be beginner, novice, intermediate, skilled and expert levels of curriculum modules. The different modules at different skill levels may include, for example, different drills or lessons for the drivers at those levels or they may include similar drills/lessons at higher difficulty levels. For example, a lower-skill-level module might include training on breaking at the entry to a corner, driving a line around a corner and accelerating out of the corner; whereas a higher-skill-level module might teach more advanced cornering skills like trail braking, heel-toe downshifting, negotiating sacrifice corners, maximizing the friction circle, and so on.

Performance benchmarks 118 may include, for example, benchmarks for particular tracks (e.g., lap times), speeds through various segments of a track, cornering speeds for various corners of a track, an ideal line around a track or on segments of a track, and so on. These performance benchmarks can be adjusted so that a driver may be evaluated against benchmarks for their corresponding skill level. More particularly, lower performance or lower speed benchmarks might be set for less experienced drivers whereas higher-speed, tighter tolerances for following the line, etc. may be set as the benchmark for higher skill level drivers. Accordingly, the system may be configured with different curriculum levels, different benchmarking levels, or both, they can be selected and applied based on the driver's skill level.

Driver feedback circuit 117 can be implemented to provide driver-training feedback to the driver for training purposes. For example, audible feedback can be provided to the driver during a training session such as verbal instructions to the driver on how to negotiate the course or on how to improve his speed through the course. Real-time visual feedback can also be provided such as, for example, on a head unit display or a heads up display. Real-time feedback can be provided immediately or almost immediately (i.e., subject only to system latencies) to provide real-time audio or visual feedback to the driver. The feedback can also be timed to be delivered at the appropriate time and location on the course where it is most relevant or useful. The feedback can also be recorded to provide the driver with a log of their performance and associated feedback so the driver knows what to work on. An example of real-time feedback might include an audible or visual display calculating the ideal time to brake for a corner based on vehicle speed, corner radius, the vehicle performance envelope (e.g. suspension characteristics, tires, environmental factors, etc.) and the driver skill level. For example, the driver may be given real-time feedback such as "Brake Now" or "Next Time Brake 25 Feet Later for This Corner." Similarly, on the next lap the driver may be reminded of the previous feedback, and at the same corner reminded to brake later for that corner.

Inference circuit 115 may be included in training system 114 to infer or determine the driver's capabilities. For example, systems may be implemented to determine a driver skill level and a driver comfort level. Inference circuit 115 may evaluate sensor data indicating a number of parameters to infer driver skill level. These may include, for example, driver biometric factors (e.g., heart rate, gaze, perspiration level, etc.); a driver's performance against benchmarks, and a driver's driving style (e.g., proper application of the brakes (e.g., so as not to overload the front tires and unload the rear tires, or to do so, if appropriate), smooth turn in, maximizing the friction circle, use of throttle steering and so on). Evaluating these parameters, inference circuit 115 may be able to accurately infer things like a driver's skill level, a driver's confidence level (e.g., confident or anxious) and a driver's general level of caution. These inferences can be used by driver training circuit 119, as discussed below, to adjust the curriculum specific tasks the for the driver such as, for example, to improve their skill level, to improve their confidence, to teach caution, and so on.

Driver training circuit 119 may be included in training system 114 to provide driver training to the driver. In some applications, driver training circuit 119 may be configured to select and apply the appropriate training level for the driver based on inferences made about the driver's performance. The adjustment can be made, for example, based on the inferred skill level of the driver, the inferred emotional state of the driver or both. For example, a driver with a higher level of skill may be given training based on more rigorous or higher level curriculum modules 116, whereas a driver identified as having a lower level of skill may be given training based on easier or lower level curriculum modules 116. In various applications, driver training circuit 119 may be configured to dynamically adjust a driver training level for the driver while the driver is operating the vehicle.

Accordingly, the driver can be given real-time feedback (e.g., from feedback circuit 117) and real-time driver training instructions (e.g., from driver training circuit 119) while the driver is operating the vehicle. In this way, the driver can receive feedback and instructions relevant to a particular portion of a track, route or other course where the driver is currently driving. Thus, the driver can implement the feedback and instructions as they are received or relate those instructions and feedback to the actual location where they are relevant. This can provide instructions and feedback that are more meaningful to the driver, may be understood in the proper context, and depending on the information, applied immediately. References in this document to a "track" on which the driver is training may be used to refer to any of a number of different tracks, circuits or courses, including permanent circuits, street circuits, speedways, and others. It may also refer to non-circuit streets or roadways on which the driver is training. Thus the term "track" is not limited to a conventional permanent-circuit race track.

As noted above, real-time information can be provided immediately or in near-real-time, subject only to system latencies. Thus, the user need not wait until the end of the lap or the end of a training session in order to receive feedback and instructions. Instructions and feedback may also be timed to be delivered at the appropriate times for the driver to apply the learning. For example, a driver approaching a same corner on a subsequent lap may be given instructions on how to better control the vehicle at that corner when the driver arrives at that corner. For example, based on the driver's performance in turn 3 during a prior lap (or laps), the user may be given instructions at turn 3 on a current lap to improve their performance (e.g., brake later, carry more speed into the turn, turn-in later, begin accelerating as the driver reduces steering input, or other instructions appropriate based on the driver's performance).

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

In various applications, driver training system 114 can be configured to be housed entirely within the subject vehicle such that the training operations and data storage can be localized and self-contained. In other applications, some or all of the functions can be performed and the data stored on the cloud (e.g. cloud server 124) or the processing and data storage can be shared with other vehicles or other entities.

Figure 2:
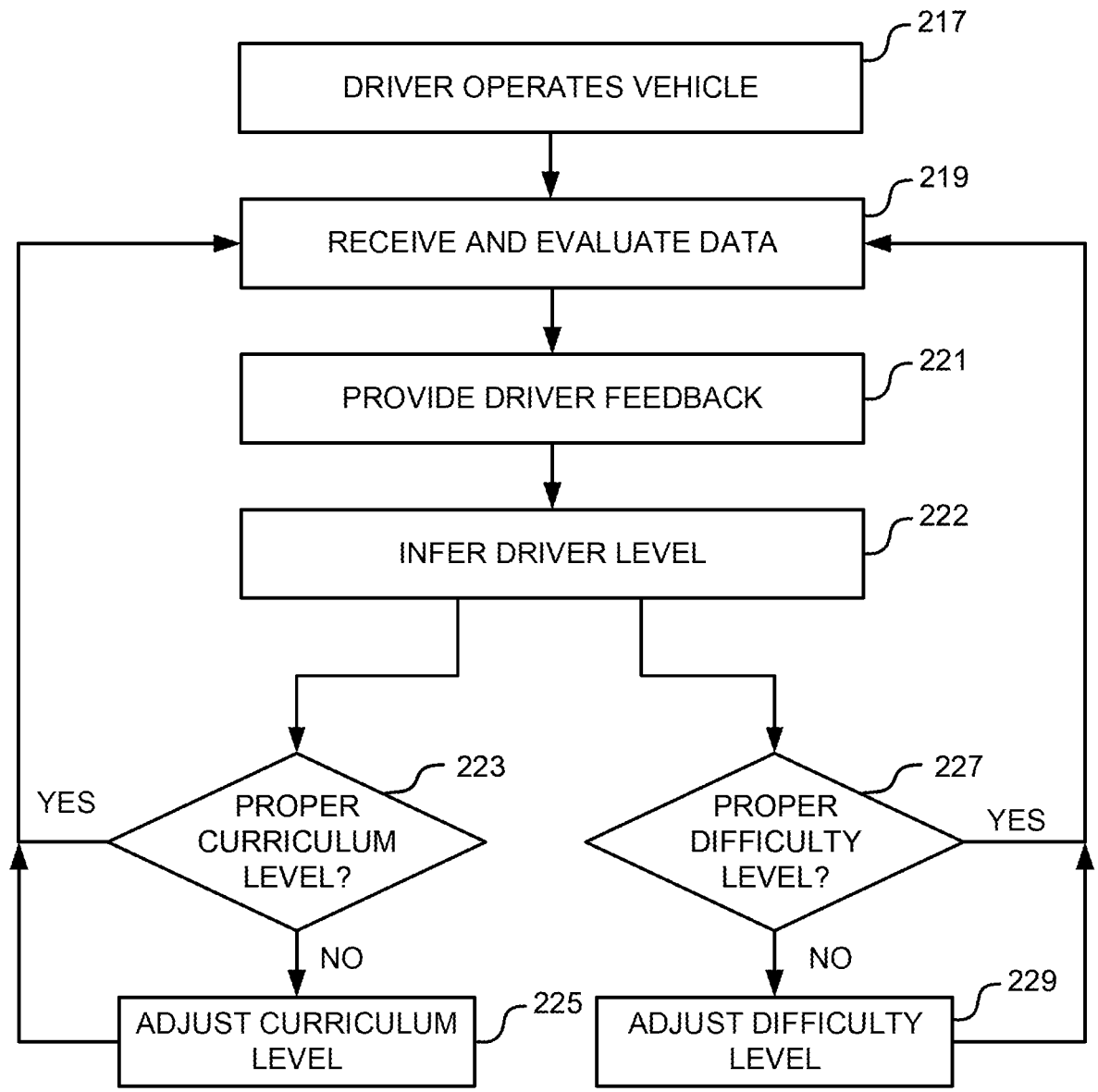
FIG. 2 illustrates an example process for adaptive dynamic driver training in accordance with various embodiments.

FIG. 2 illustrates an example process for dynamic driver training in accordance with various embodiments.

Referring now to FIG. 2, at operation 217 a driver operates a vehicle (e.g., vehicle 102 in the example of FIG. 1). In some implementations, the driver is operating the vehicle as part of the training so that driver performance data can be collected by various sensors (e.g., sensors 112 in the example of FIGS. 1 and 3). In some applications, driver-related data can also be collected prior to a training session and used to baseline the driver's performance.

As described above, driver biometric sensors (e.g., biometric sensors 338 in the example of FIG. 3, below) may be included to collect data relating to the driver's comfort level or emotional state. Examples may include heart rate sensors to detect the driver's heart rate, eye gaze sensors to detect eye movement and direction, perspiration sensors, body motion sensors (e.g., head, arm, hand, etc. movements), and other biometric sensors. Driver input sensors can be included in driver training system 300 to sense driver inputs to vehicle systems, like throttle input, steering angle, brake input, and so on. Emotional state may refer to the anxiety or comfort level of the driver, and may also or alternatively refer to the level of confidence exhibited by the driver. Accordingly, other than biometric sensors, evaluation of data from other sensors may also lead to an inference of driver confidence level. For example, confident drivers may drive at speeds lower than their skill levels, and operate well within the vehicle's envelope.

There may be several different ways in which a driver's confidence, caution and skill levels can be inferred based on the collected data. For example, data indicating how well a driver may maneuver a vehicle around a course may be used to infer skill. As a further example, faster speed (e.g., through a corner or in a track segment) implies a higher level of skill; how closely the driver follows the racing line can be used to infer skill, and how well the driver is able to drive to the friction limits can also be used to infer skill.

As examples of inferring confidence, how quickly a driver accelerates and decelerates may be used to infer a level of confidence, how much the driver exceeds the friction limits may also be used to infer confidence, and how much the driver deviates from the racing line might also infer confidence. Biometric data such as heart rate, skin conductivity and pupil dilation can also be used to infer driver confidence. Levels of caution might be inferred, for example, based on the appropriateness of the driver's speed for given conditions or for a given segment of the course. As other examples, data indicating a high level of confidence in a low level of skill may indicate a low level of caution. Data indicating that a driver has a high level of skill and is fairly confident, but is not utilizing this skill to the fullest may indicate a high level of caution. In some applications, confidence and caution may be conflated (e.g., a level of over-confidence may be the same as or similar to a level of too little caution).

Vehicle sensors (examples of which are also described in FIG. 3, below) can be included and used to provide information about the vehicle state. Information about the vehicle state may be utilized to determine whether, among other things, the driver is pushing the vehicle toward the limits of its performance envelope, how close to the limits the driver is achieving, and with respect to which characteristics is the driver pushing the limits. This information can be useful to infer the driver's skill level as well as the driver's emotional state. In addition to vehicle information, information about the environment in which the vehicle is currently operating can also be useful to infer driver competence and emotional state. Because the performance envelope varies with the environment (e.g., snow and rain may reduce friction, cold weather may affect tire performance and grip, high altitudes may affect engine performance, and so on), this information can be useful in inferring driver confidence and skill level.

At operation 219, the system receives and evaluates data from one or more sensors to determine driver performance characteristics. As described above, this may include data from sensors such as, for example, biometric sensors, vehicle sensors, and environmental sensors and so on. The system may also receive other data useful for driver evaluation. This may include vehicle performance envelope parameters, circuit parameters and benchmarks, other vehicle data, and so on. Vehicle performance envelope parameters may include data regarding the subject vehicles performance limits in different environmental conditions. For example, the vehicle's friction circles, lateral acceleration limits, braking limits, understeer/oversteer characteristics, and so on. This can be useful to determine how close to the vehicles limits the driver is pushing the vehicle, which in turn may be used to infer driver skill level. Circuit parameters and benchmark may include, for example, information about the track or other course on which the driver is operating the vehicle currently. This can include information such as, for example, expected course lap times at different skill levels and lap records, speeds in corners or through various segments of the course, the ideal line through the course, track measurements (e.g., segment distances, corner radii, etc.) and other information about the course or segments thereof that may be useful in evaluating driver performance. Vehicle, track and other information can be further broken down based on the environment (e.g., whether) as segment times, lap records, and other parameters may be affected by current environmental conditions. Accordingly, the system can evaluate driver performance in view of current environmental conditions.

As part of this evaluation at operation 219, the system uses this information to evaluate driver performance. At one level, (e.g. at a macrolevel), the system can evaluate the driver's performance at a particular instance in time for a segment of the track. For example, the system may be configured to evaluate how the driver approached and handled a particular corner of the circuit. For example: Did the driver brake too soon or too late heading into the corner? Did the driver downshift at the appropriate time? Did the driver carry too much or too little speed into the corner? Did the driver turn in too soon or too late into the corner? Did the driver follow the optimum line through the corner, and if not, why not? Did the driver began accelerating out of the corner at the appropriate time (e.g., considering steering input angles as well as on-track position)? Was the driver's steering input smooth and controlled or jerky? And so on.

The system can not only infer skill level, but in some implementations may also be able to infer driver confidence and caution levels. Feedback and training levels may be tailored based on the driver's mix of confidence/caution and skill levels. For example, a driver who is inferred as having a high skill level, but a low level of confidence (or too high a level of caution) is probably not utilizing their skills to the fullest extent. Therefore, the feedback and training may be geared toward encouraging the driver to push themselves a little harder to utilize more of their skill. On the other hand, a driver that is not cautious and not very skilled will be encouraged to slow it down and learn to control the vehicle better. Skilled but not overly cautious drivers will be encouraged to continue learning to improve their skills. As these examples illustrate, the emotional state of the driver (which might not only be anxiety levels, but may also be their level of confidence or caution) can be used in conjunction with an inference of the driver's skill level to better tailor the training in accordance with their needs.

At operation 221, this information, upon evaluation, can be used to provide dynamic and immediate feedback to the driver based on the driver's performance at the particular evaluated moment. For example, the system can provide feedback that instructs the driver how to improve his or her driving performance based on the systems evaluation of how they handle that particular circumstance. Following with the example of the driver maneuvering through a particular corner, based on evaluation the system can provide feedback on what the driver can do to improve on that corner of the track in future laps. For example, depending on the driver's performance the driver may be coached to brake later going into the corner, turn in later going into the corner, and so on. This information may be useful to the driver the next time the driver negotiates the same section of the track and it may also provide information that the driver can apply more generally throughout other sections of the track.

The system is not limited to providing feedback about a particular section or segment of the track, but can also provide feedback on the driver's driving performance, characteristic and styles in general. Again, the feedback can be dynamic (e.g. provided in real time and tailored to the particular driver based on his or her driving performance) and it can be immediate. Driver feedback may be provided through a number of different mechanisms. For example, driver feedback may be provided as audible feedback giving verbal instructions to the driver on how to improve their driving. Voice synthesis can be used to generate audible feedback that can be played to the driver through the vehicle's head unit, through other vehicle speakers, or through dedicated speaker system as part of the driver training system. Nonverbal audio alerts such as tones can also be used to provide feedback. In further implementations, visual feedback can be provided to the driver as well. For example, information can be provided on a heads up display or on a display screen of the vehicle head unit giving the driver dynamic feedback about his or her performance. For example, visual cues regarding when to brake the vehicle, how to begin applying acceleration as steering input is reduced, how far off of the ideal line the driver is, and so on. Additionally, feedback can be stored and a report generated that can be used by the driver after the session is completed for further study.

As yet another example, feedback can be provided as haptic feedback provided to the driver through instrumentalities such as, for example, the steering wheel, seats, gas/brake/clutch petals, the seat, and so on. For example, if the driver is turning in too soon, a small amount of resistance might be introduced into the steering wheel to nudge the driver back onto the proper line (e.g., using an MPC controller); or if the driver brakes too soon going into a corner, pedal resistance or vibration at the brake pedal can provide feedback to the driver that they should be braking later for the corner.

As yet a further example, advanced driver assistance systems (ADAS) or autonomous vehicle (AV) systems may be used to take over full or partial control of the vehicle, depending on the circumstances. This may be done not only for training purposes but also for safety purposes, if needed. As one example of using these autonomous or semi-autonomous systems, the driver training system may instruct the driver to allow the vehicle to operate itself through a particular corner so that the driver can see an example of how the vehicle should be operated in that corner.

At operation 222 the system can also use the data and evaluation at operation 219 to infer driver performance. The system can use the data to infer, for example, driver a driver skill level and comfort level (e.g., anxious, confident, etc.). For example, machine learning models can be built and trained and used to create an inference on the driver's skill and comfort level. Models can be trained over time using data from different drivers of different known skill levels. Driver skill may be inferred based on, for example, how well the driver handles the vehicle relative to vehicle performance envelopes and circuit (track) parameters. E.g., what velocity is the driver carrying in turns or other segments of the circuit, how much of the friction circle is the driver using, is the driver operating the vehicle on the track at $6/10$ths, $7/10$ths, etc., and so on. Driver confidence, which may be somewhat decoupled from skill can likewise be inferred based on driver behavior as captured by the sensor data. For example, is the driver hesitant when accelerating out of corners, does the driver tend to brake for corners too early, do the driver's biometrics indicate nervousness, and so on.

As the above description indicates, the feedback provided to the driver can be based on the inferred levels of performance such as skill, confidence and caution. A goal of a driver training system in accordance with various embodiments may be to maintain a level of driver safety while also pushing trainees to learn and excel. The system may be configured to provide feedback that encourages drivers who are skilled but not confident to push themselves safely, for example. Drivers who are skilled and confident may be leveled up as described, for example, in the following paragraphs. Drivers who are skilled but overly confident may be provided feedback warning them to be more careful and also providing instructions how/where to be more careful. The system may be configured to provide drivers who are less skilled and less confident to be given praise and positive feedback to encourage them, build their confidence and reduce their anxiety. Drivers who are less skilled and overly confident may be warned and may be given stricter limits on speed/friction to keep them safe. Where the system determines that safety is an issue, embodiments may be implemented that partially or fully engage ADAS or AV levels of vehicle control to avoid or mitigate the seriousness of potential accidents. Embodiments may also be implemented to govern the maximum speed of the vehicle, whether overall or at various segments of the course.

Figure 3:
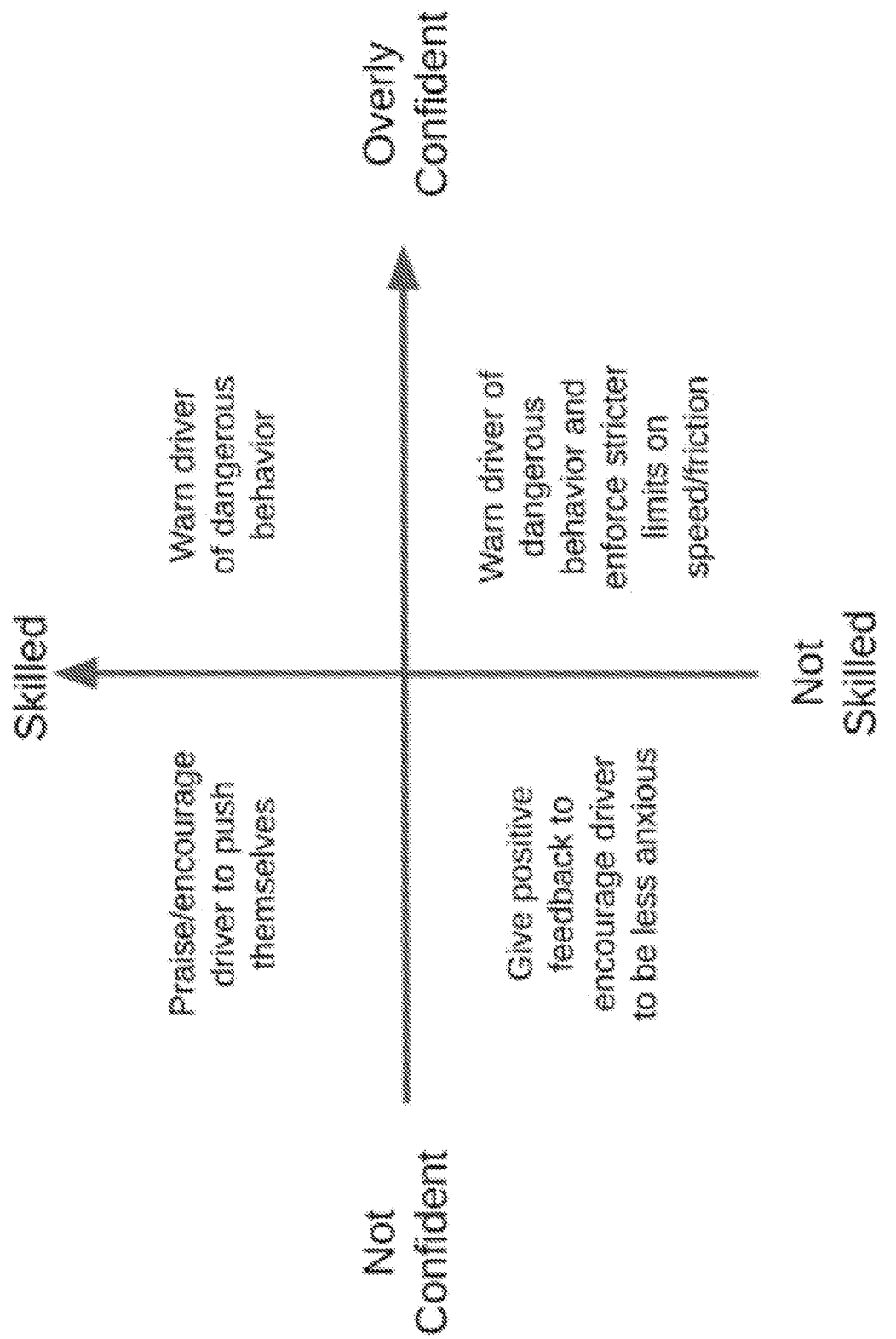
FIG. 3 is a quadrant diagram illustrating an example driver feedback matrix in accordance with various embodiments.

FIG. 3 is a quadrant diagram illustrating an example driver feedback matrix in accordance with various embodiments. This example illustrates possible feedback scenarios based on a driver's skill and confidence levels. As this example illustrates drivers who are skilled but not confident may be given praise and encouragement to push themselves a little harder. Drivers who are skilled but overly confident may be warned of dangerous behavior. The warnings might be specific depending on the driver's performance as drivers may be overconfident in some spots yet under confident in others. Unskilled drivers who are not inferred as being competent are also given positive feedback to encourage higher levels of confidence. However, they might not be given encouragement to push themselves harder as they do not have the skill levels to do so. They may be given encouragement to calm them down so they are less anxious and can gain confidence. Drivers who are not skilled and overly confident may be warned of dangerous behavior and vehicle limits may be imposed. Not only is feedback given to the driver, but information may be used to tailor the appropriate curriculum for the driver. Examples of this are discussed further below.

Descriptions above include examples of modifying vehicle parameters (e.g., providing a governor on the top speed) as part of feedback. Other examples may include shared control to adjust the friction limit, shared control with the speed limit, and visual feedback. Shared control with a friction limit may use an MPC controller to nudge vehicle components (e.g., steering/braking/throttle) to keep the driver within a set friction limit. As the driver's skill level increases, the system can also adjust these components to increase the friction limit. To implement shared control with a speed limit, in bodies made precomputed optimal trajectory with the optimal velocity at various points along the track. The system can then be configured to limit speed to be a certain percentage of that velocity based on the driver's skill level. As the driver skill level increases, the percentage of velocity allowed at various points on the track may also increase. The increases may be tailored based on the aspects of the driver skill level that have improved (e.g., improvement in gentle corners may lead to increase velocity through those corners, but not through decreasing radius corners or sharper corners). Visual feedback may include providing AR or heads-up racing line to the driver. Embodiments may label the line with colors (e.g., green for speed up, read for slowdown) to provide further information. Embodiments may calculate the racing line in colors using the MPC controller with an adjustable speed limit, friction limit, etc., with or without a shared control aspect. Thus, skilled drivers may be instructed (e.g., using colors) to increase their speed at a particular segment of the course. Again, the instructions can be tailored to the driver's particular skill set to account for a driver's varying ability to handle different segments of the track.

At operation 223, the driver training system evaluates the driver performance level inferred at operation 222 and determines the appropriate curriculum level for the driver based on their performance. In some applications, the driver may be asked to run a determined quantity of calibration laps prior to any training to determine the appropriate initial curriculum level at which to start the training. As part of ongoing training, the driver's performance can be continually evaluated and the driver's performance level compared against the current curriculum level. In this manner, the curriculum can be adjusted as appropriate based on the driver's current performance levels. For example, as the driver's performance level improves, the driver can be provided more challenging training curriculum so that the driver continues to grow. In other words, the training can be adjusted dynamically (up or down) to keep up with the driver's current performance levels. Accordingly, at operation 225, if warranted, the curriculum level can be adjusted to match driver performance inferred at operation 223. Accordingly, the system may be configured to select a curriculum level for the driver that is commensurate with the inferred skill level of the driver, and implement the selected curriculum level in real-time while the driver is operating the vehicle during training on the track. The curriculum can be adjusted on the fly, during training, so that the driver receives the appropriate level of training Similarly, at operation 227, the driver training system evaluates the driver performance level inferred at operation 223 and determines the appropriate difficulty level for the driver. In some applications, there might be different difficulty levels within a given curriculum level. For example, within given curriculum levels, drivers may be given more challenging or less challenging requirements throughout the course. As a further example, a particular curriculum level might focus on specific skills or specific sets of skills (e.g., trail braking, throttle steering, etc.) and the difficultly level might set performance demands (e.g., speed through a corner, etc.). In some applications, curriculum level and difficulty level may be conflated (e.g., different difficulty levels for a given set of lessons might constitute different curriculum levels) or they may be separate as described above.

As with determining the curriculum level, the driver may be asked to run a determined quantity of calibration laps prior to any training to determine the appropriate initial difficulty level at which to start the training. In some applications, the calibration laps can be used to determine both the proper curriculum level and difficulty level. As part of ongoing training, the driver's performance can be continually evaluated and the driver's performance level compared against the current difficulty level. In this manner, the difficulty level can be adjusted (independently or within the selected curriculum level) as appropriate based on the driver's current performance levels. For example, as the driver's performance level improves, the driver can be provided more difficult training goals so that the driver continues to grow. In other words, the training can be adjusted dynamically (up or down) to keep up with the driver's current performance levels. Accordingly, at operation 229, if warranted, the curriculum level can be adjusted to match driver performance inferred at operation 223.

As part of curriculum and difficulty level adjustments, for example, the system might start novice drivers with lower friction limits (e.g., limit friction to 0.7 g or other limited number) and increase the friction limit as the driver skill in improves. As another example, the system might start driver expectations at $7/10$ths (or other appropriate amount), limit the maximum velocity at various points were segments of the track, and so on. As illustrated by the example of FIG. 2, the driver training system may continue to receive and evaluate data on an ongoing basis.

Figure 4:
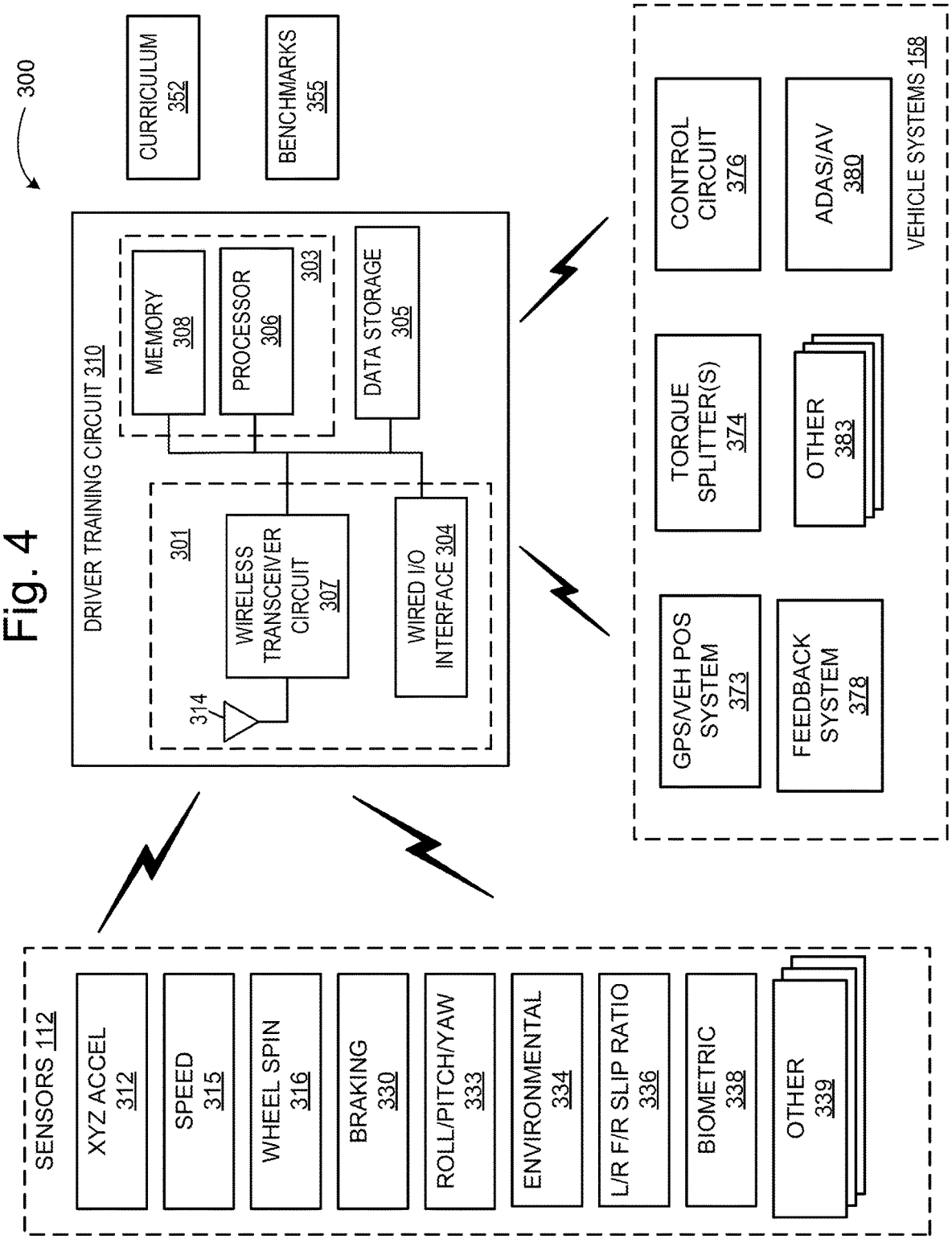
FIG. 4 illustrates an example architecture for adaptive dynamic driver training in accordance with various embodiments.

FIG. 4 illustrates an example driver training system 300 in accordance with various embodiments. Referring now to FIG. 4, in this example, driver training system 300 includes a driver training circuit 310, a plurality of sensors 112 and a plurality of vehicle systems 158. Sensors 112 and vehicle systems 158 can communicate with driver training circuit 310 via a wired or wireless communication interface. Although sensors 112 and vehicle systems 158 are depicted as communicating with driver training circuit 310, they can also communicate with each other as well as with other vehicle systems. driver training circuit 310 can be implemented as an ECU or as part of an ECU such as, for example controller 110. In other embodiments, driver training circuit 310 can be implemented independently of the ECU or other vehicle controller.

As illustrated in the example of FIG. 4, a number of sensors 112 (e.g., sensors 112 as in the example of FIG. 1, or other sensors) can be relied on as part of the driver training system 300 for driver training. The example of FIG. 3 includes a three axis accelerometer 312, a vehicle speed sensor 315, a wheelspin sensor 316, a braking or brake torque sensor 330, a roll/pitch/yaw sensor 333, environmental sensors 334, left/right/front/rear slip ratio sensors 336, biometric sensors 338, and other sensors 339.

Sensors 112 can be dedicated sensors included solely for driver training system 300 or they can be sensors that are shared with and used by other vehicle or vehicle-related systems and functions.

Driver training circuit 310 in this example includes a communication circuit 301, a processing system 303 (including a processor 306 and memory 308 in this example) and data storage 305. Components of driver training circuit 310 are illustrated as communicating with each other via a data bus, although other communication in interfaces can be included.

Processor 306 can include one or more GPUs, CPUs, microprocessors, or any other suitable processing system. Processor 306 may include one or more single core or multicore processors. The memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308, can be made up of one or more modules of one or more different types of memory, and may be configured to store data and other information as well as operational instructions that may be used by the processor 306 to driver training circuit 310. Data storage 305 may include memory or other storage media for storing data, additional program instructions, and so on. One or more processing systems 303 may be used, for example, to implement inference circuit 115, feedback circuit 117 and training circuit 119.

Although the example of FIG. 4 is illustrated using processor and memory circuitry, as described below with reference to circuits disclosed herein, driver training circuit 310 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driver training circuit 310.

Communication circuit 301 includes either or both a wireless transceiver circuit 307 with an associated antenna 314 and a wired I/O interface 304 with an associated hardwired data port (not illustrated). As this example illustrates, communications with driver training circuit 310 can include either or both wired and wireless communications circuits 301. Wireless transceiver circuit 307 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 314 is coupled to wireless transceiver circuit 307 and is used by wireless transceiver circuit 307 to transmit radio signals wirelessly to wireless equipment with which it is connected and to receive radio signals as well. These RF signals can include information of almost any sort that is sent or received by driver training circuit 310 to/from other entities such as sensors 112 and vehicle systems 158.

Wired I/O interface 304 can include a transmitter and a receiver (not shown) for hardwired communications with other devices. For example, wired I/O interface 304 can provide a hardwired interface to other components, including sensors 112 and vehicle systems 158. Wired I/O interface 304 can communicate with other devices using Ethernet or any of a number of other wired communication protocols whether standardized, proprietary, open, point-to-point, networked or otherwise.

A dedicated power supply (not illustrated) can be provided and can include one or more of a battery or batteries (such as, e.g., Li-ion, Li-Polymer, NiMH, NiCd, NiZn, and NiH$_3$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Vehicle systems 158 can include any of a number of different vehicle components or subsystems used to control or monitor various aspects of the vehicle and its performance. In this example, the vehicle systems 158 include a GPS or other vehicle positioning system 373; torque splitters 374 that can control distribution of power among the vehicle wheels such as, for example, by controlling front/rear and left/right torque split; engine/motor control circuits 376 to control the operation of engine or motor (e.g. motor 104 or internal combustion engine 106); feedback systems 378 to provide feedback to the driver; ADAS and AV systems 380 to help control the vehicle for training or for safety reasons; and other vehicle systems 383 as may be useful for the driver training system 300.

Driver training system 300 also includes curriculum 352 and track data 355, which may be stored locally on the vehicle, in the cloud, one other vehicles, or a combination of the foregoing. Curriculum 352 can include the various training curricula at the different curriculum levels. Track data 355 can include benchmarking other information about the track, examples of which are described above (including, e.g., lap times, segment speeds, and so on).

During operation, driver training circuit 310 can receive information from various vehicle sensors 112 to evaluate driver performance. Communication circuit 301 can be used to transmit and receive information between driver training circuit 310 and sensors 112, and driver training circuit 310 and vehicle systems 158. Also, sensors 112 may communicate with vehicle systems 158 directly or indirectly (e.g., via communication circuit 301 or otherwise).

Figure 5:
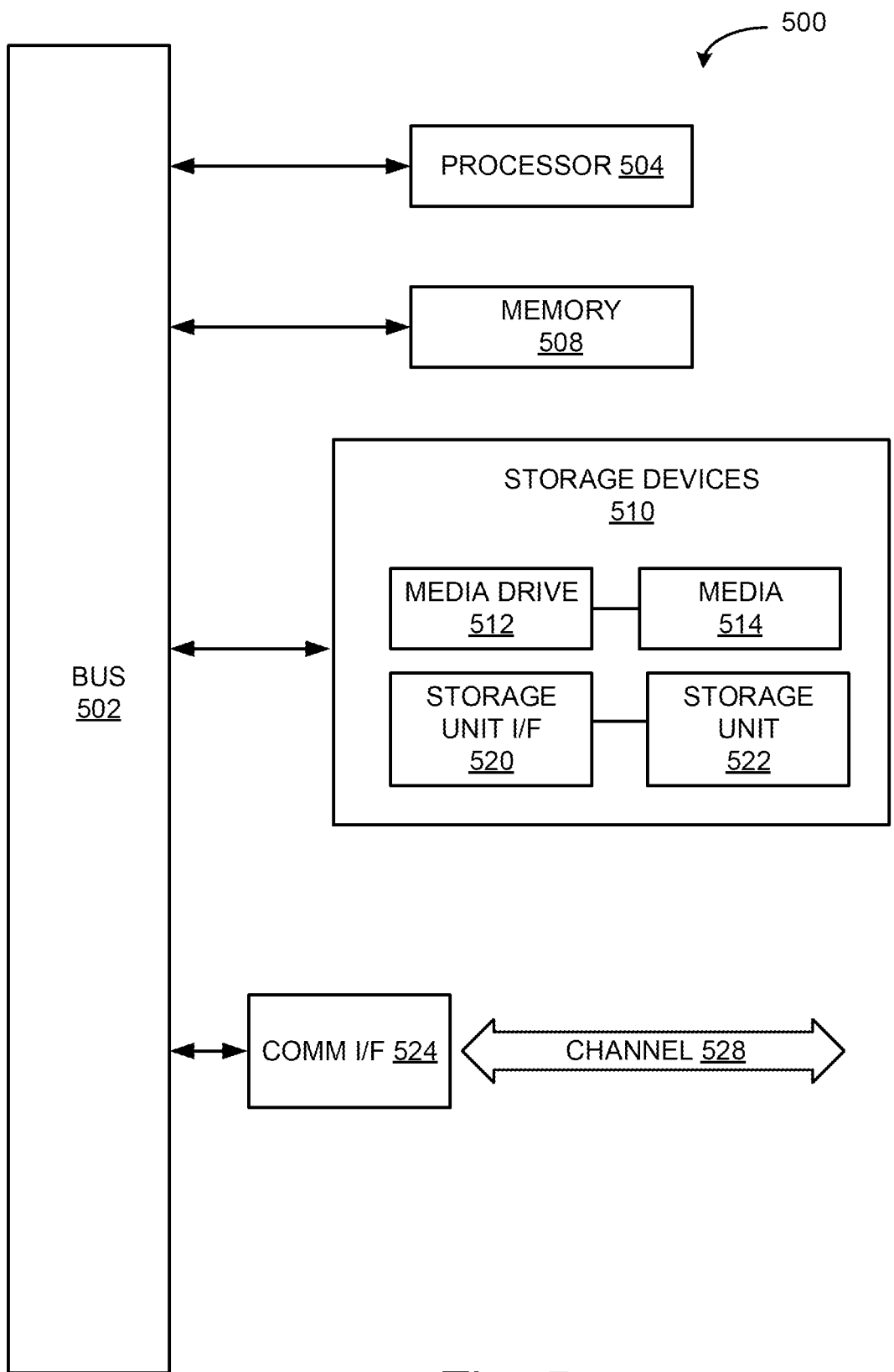
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 522, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A driver training system comprising:
a driver training circuit to, based on at least one of an inferred skill level or an emotional state of a driver operating a vehicle, dynamically adjust a driver training level for the driver while the driver is operating the vehicle during training, wherein dynamically adjusting a driver training level for the driver comprises:
selecting a first driver training level, from a plurality of driver training levels, for the driver based on at least one of the inferred skill level or inferred emotional state of the driver, wherein each of the plurality of driver training levels comprises at least one of: a set of skills or a set of performance benchmarks, wherein the first driver training level applies one or more first actuation or steering ranges resulting from an actuation or a steering input of the driver; and selectively changing to a second driver training level of the plurality of driver training levels, wherein the second driver training level applies one or more second actuation or steering ranges resulting from the actuation or the steering input of the driver, the one or more second actuation or steering ranges being different compared to the one or more first actuation or steering ranges.

2. The driver training system of claim 1, further comprising a driver feedback circuit to provide real-time driver-training feedback to the driver while the driver is operating the vehicle on a training track, wherein the real-time driver-training feedback indicates a deficiency of a driving behavior, and the real-time driver-training feedback is repeated upon detecting a related driving scenario.

3. The driver training system of claim 2, wherein the real-time driver-training feedback comprises at least one of audio, visual and haptic feedback.

4. The driver training system of claim 3, wherein the real-time driver-training feedback comprises haptic feedback; the haptic feedback comprising a variable force on one or more vehicle components that variably limits a range of motion of the one or more vehicle components or provides a variable amount of vibration on the one or more vehicle components, wherein the haptic feedback comprises a higher resistance on an actuation or navigation component of the vehicle for a driver with a lower skill level, or a driver having a mismatch between a skill level and an emotional state.

5. The driver training system of claim 1, further comprising a driver feedback circuit to provide timed feedback to the driver, wherein the timed feedback is timed to be delivered to the driver to provide feedback relevant to a particular segment of a training track when the driver is operating the vehicle at that particular segment of the training track.

6. The driver training system of claim 1, wherein dynamically adjusting a driver training level for the driver comprises selecting a curriculum level for the driver that is commensurate with the inferred skill level of the driver, and implementing the selected curriculum level while the driver is operating the vehicle during training on a training track.

7. The driver training system of claim 6, wherein dynamically adjusting a driver training level for the driver comprises selecting a difficulty level driver that is commensurate with the inferred skill level of the driver, and implementing the selected difficulty level within the selected curriculum level while the driver is operating the vehicle during training on the track.

8. The driver training system of claim 1, wherein the inferred emotional state of the driver comprises an inferred level of confidence of the driver, and further wherein dynamically adjusting a driver training level for the driver comprises selecting a curriculum level for the driver that is commensurate with the inferred level of confidence of the driver, and implementing the selected curriculum level while the driver is operating the vehicle during training on a training track.

9. The driver training system of claim 1, wherein inferring a skill level and emotional state of the driver comprises using a racing controller model that includes driver attributes as inferable parameters or using a model learned from labeled data.

10. The driver training system of claim 1, wherein the inferred skill level and the inferred emotional state are normalized based on one or more environmental conditions.

11. The driver training system of claim 1, wherein the inferred skill level is based on operational parameters of the vehicle relative to a performance envelope of the vehicle, the performance envelope defining limits of the operational parameters.

12. The driver training system of claim 1, wherein the inferred skill level is based on one or more biometric factors, the biometric factors comprising heart rate data, eye gaze data, or perspiration data of the driver.

13. The driver training system of claim 1, wherein the one or more second actuation or steering ranges and the one or more first actuation or steering ranges each include a non-zero actuation or steering output, and each define one or more actuation or steering output limits of an actuation or steering component.

14. The driver training system of claim 1, wherein selectively changing to the second driver training level comprises changing to the second driver training level in response to the vehicle approaching a turn having a greater than threshold radius of curvature and remaining at the first driver training level in response to the vehicle approaching a turn having a smaller than threshold radius of curvature.

15. A method for driver training, comprising:
inferring a skill level and emotional state of a driver operating a vehicle; and
based on at least one of an inferred skill level and emotional state of the driver operating a vehicle, dynamically adjusting a driver training level for a driver while the driver is operating the vehicle during training, wherein dynamically adjusting a driver training level for the driver comprises:
selecting a first driver training level, from a plurality of driver training levels, for the driver based on at least one of the inferred skill level or inferred emotional state of the driver, wherein each of the plurality of driver training levels comprises at least one of: a set of skills or a set of performance benchmarks, wherein the first driver training level applies one or more first actuation or steering ranges resulting from an actuation or a steering input of the driver; and
selectively changing to a second driver training level of the plurality of driver training levels, wherein the second driver training level applies one or more second actuation or steering ranges resulting from the actuation or the steering input of the driver, the one or more second actuation or steering ranges being different compared to the one or more first actuation or steering ranges.

16. The method for driver training of claim 15, further comprising providing real-time driver-training feedback to the driver while the driver is operating the vehicle on a training track, wherein the real-time driver-training feedback indicates a deficiency of a driving behavior, and the real-time driver-training feedback is repeated upon detecting a related driving scenario.

17. The method for driver training of claim 16, wherein the real-time driver-training feedback comprises at least one of audio, visual and haptic feedback.

18. The method for driver training of claim 15, further comprising providing timed feedback to the driver, wherein the timed feedback is timed to be delivered to the driver to provide feedback relevant to a particular segment of a training track when the driver is operating the vehicle at that particular segment of the training track.

19. The method for driver training of claim 15, wherein dynamically adjusting a driver training level for the driver comprises selecting a curriculum level for the driver that is commensurate with the inferred skill level of the driver, and implementing the selected curriculum level while the driver is operating the vehicle during training on a training track.

20. The method for driver training of claim 19, wherein dynamically adjusting a driver training level for the driver comprises selecting a difficulty level driver that is commensurate with the inferred skill level of the driver, and implementing the selected difficulty level within the selected curriculum level while the driver is operating the vehicle during training on the track.

* * * * *